United States Patent
Barkan et al.

(10) Patent No.: US 10,685,198 B1
(45) Date of Patent: Jun. 16, 2020

(54) BARCODE READERS INCLUDING ILLUMINATION ASSEMBLIES WITH DIFFERENT COLOR LIGHTS

(71) Applicant: Zebra Technologies Corporation, Lincolnshire, IL (US)

(72) Inventors: Edward Barkan, Miller Place, NY (US); Darran Michael Handshaw, Sound Beach, NY (US); Matthew D. Blasczak, Shirley, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/224,446

(22) Filed: Dec. 18, 2018

(51) Int. Cl.
*G06K 7/10* (2006.01)

(52) U.S. Cl.
CPC ....... *G06K 7/10732* (2013.01); *G06K 7/1096* (2013.01); *G06K 7/10831* (2013.01)

(58) Field of Classification Search
CPC ........... G06K 7/10732; G06K 7/10831; G06K 7/1096
USPC ....................................... 235/462.42, 462.01
See application file for complete search history.

(56) References Cited

U.S. PATENT DOCUMENTS

| | | | | |
|---|---|---|---|---|
| 8,752,768 B2* | 6/2014 | Gao | ........................ | G06K 7/10 235/462.41 |
| 9,836,679 B2* | 12/2017 | Crooks | .............. | G06K 7/10861 |
| 10,133,897 B1* | 11/2018 | Bassani | .................... | G02B 3/06 |
| 2003/0205620 A1* | 11/2003 | Byun | .................... | G06K 7/1096 235/462.14 |
| 2005/0011956 A1* | 1/2005 | Carlson | .............. | G06K 7/10732 235/462.42 |
| 2010/0059589 A1* | 3/2010 | Goncalves | ......... | G06K 9/00771 235/383 |
| 2012/0150589 A1* | 6/2012 | Xian | .................. | G06K 7/10128 705/7.42 |
| 2012/0284091 A1* | 11/2012 | Colavito | .......... | G06Q 10/06398 705/7.42 |
| 2013/0126618 A1* | 5/2013 | Gao | ........................ | G06K 7/10 235/469 |
| 2013/0175341 A1* | 7/2013 | Kearney | .............. | G06K 7/1096 235/440 |
| 2017/0154254 A1* | 6/2017 | Crooks | .............. | G06K 7/10861 |

* cited by examiner

*Primary Examiner* — Paultep Savusdiphol
(74) *Attorney, Agent, or Firm* — Yuri Astvatsaturov (57) ABSTRACT

Imaging arrangements and barcode readers including such imaging arrangements. An imaging arrangement for use in a barcode reader includes a housing. The imaging arrangement also includes a light source configured to emit light along a central light axis. The light source is disposed in the housing. The imaging arrangement also includes a lens having a first surface and a second surface opposite the first surface. The lens is disposed in the housing. The first surface is configured to face the light source and is structured to substantially collimate light received from the light source into a collimated beam. The second surface includes surface structures structured to generate a patterned beam in response to receiving the collimated beam.

20 Claims, 8 Drawing Sheets

BARCODE READERS INCLUDING ILLUMINATION ASSEMBLIES WITH DIFFERENT COLOR LIGHTS

FIELD OF THE DISCLOSURE

The present patent relates generally to barcode readers and, in particular, relates to barcode readers including illumination assemblies with different color lights.

BACKGROUND

Venues, such as retail stores, often use bi-optic barcode readers in the checkout process to read barcodes affixed to products being checked out. Bi-optic barcode readers are typically formed with a horizontal window and a vertical window arranged in a way that image data can be captured by internal imaging components (e.g., imaging sensors) through either of the two windows. While these bi-optic barcode readers are effective at reading barcodes, known barcode readers are unable to provide non-barcode imaging data that may be used to further monitor the checkout process.

Accordingly, there remains a demand for continued design improvements in the field of bi-optic barcode readers that address the need of providing non-barcode imaging data.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed examples, and explain various principles and advantages of those embodiments.

The apparatus and method components have been represented where appropriate by conventional symbols in the drawings, showing only those specific details that are pertinent to understanding the disclosed examples so as not to obscure the disclosure with details that will be readily apparent to those of ordinary skill in the art having the benefit of the description herein.

DETAILED DESCRIPTION

The examples disclosed herein relate to barcode readers that generate color images using a monochrome image sensor(s). Thus, the disclosed examples can determine a color of an object being scanned without incorporating an additional imaging assembly (e.g., a color camera). The object may be a piece of produce such as, for example, a banana. This same monochrome image sensor can additionally be used to capture barcode data from the object.

To enable color images to be generated using a monochrome image sensor(s), the barcode imaging systems sequentially obtain monochrome images when the object is illuminated with different color lights using an illumination assembly. The illumination assembly may be disposed within (or otherwise carried by) the barcode reader and/or may be spaced from the barcode reader. As set forth herein, the phrase "carried by" in regards to the illumination assembly and the barcode reader means that the illumination assembly is disposed within or otherwise coupled to the barcode reader. For example, the illumination assembly can be coupled to an exterior surface of the barcode reader. However, regardless of where the illumination assembly is positioned, the illumination assemblies are coupled (communicatively coupled) to the barcode scanner to enable the illumination assembly to illuminate at the appropriate time.

The illumination assembly may include a first color illumination light (e.g., a red light-emitting diode (LED)), a second color illumination light (e.g., a green LED) and a third color illumination light (e.g., a blue LED). Thus, in this example, the first color illumination light (red) is the same light that is typically used when reading bar codes. Additionally or alternatively, a white light may be generated by the illumination assembly. The white light may be generated by illuminating the first, second and third color illumination lights at the same time. Alternatively, an additional LED (e.g., a white LED) may be included. The wavelengths of the illumination lights can be arranged in the CIE chromaticity space to achieve a preferred color gamut.

To generate a color image from the monochrome images (frames), the monochrome images are combined into a single color image. Specifically, the color image is synthesized using the red, blue and green vectors obtained when the object is illumined using the different illumination lights. The color of the object can be determined by generating a color vector of the object and comparing the color vector to reference data. To remove ambient light from the color images generated, a fourth monochrome image can be obtained without the object being illuminated. To account for the ambient light, the ambient light may be subtracted from each of the red monochrome image, the green monochrome image and the blue monochrome image and the resulting images are thereafter combined to generate a color image.

After a trigger event occurs, the barcode reader obtains the images of the object under the different lighting conditions during an image capture time period. The trigger event may include the barcode reader successfully decoding barcode data associated with the object, the object being identified as stable, an audio input being received and/or a manual input being received (e.g., a button being pushed).

To determine that the object is relatively stable (stationary), the barcode reader can detect a dwell in measured weight of the object on a platter of the barcode reader. In other examples, to determine that the object is relatively stable, the barcode reader can detect a dwell in values obtained from an Infrared (IR) sensor of the barcode reader (e.g., IR wakeup count). However, if movement of the object is detected as one or more of the first image, second image or the third image is obtained, the barcode reader and/or an associated controller can stabilize the images or can otherwise compensate for the movement. For example, motion blur can be removed (or substantially removed) if movement of the object is detected between frames by shifting the object accordingly in one or more of the frames. After the object(s) is shifted, the position of the object overlaps in the different images. Additionally or alternatively, to compensate for movement of the object, a filter can be applied to the images.

While the above examples disclose sequentially illuminating the object with different colors and obtaining monochrome image data under different color illumination conditions, in other examples, illuminating all color lights at the same time may be advantageous in assisting the barcode readers to read some barcodes. For example, illuminating a red light, a green light, and a blue light at the same time creates white light that illuminates the barcode being read.

In a first example, a barcode reader configured to be supported by a workstation includes a first housing portion supporting a generally horizontal platter having a generally horizontal window. The barcode reader also includes a second housing portion supporting a generally vertical window and an image capture arrangement having a first set of optical components and a second set of optical components. The first set of optical components are positioned at least partially within the first housing portion. The first set of optical components are configured to direct a first field of view (FOV) through the generally horizontal. The second set of optical components are positioned at least partially within the second housing portion. The second set of optical components are configured to direct a second FOV through the generally vertical window. The barcode reader also includes an illumination assembly. The illumination assembly includes an illumination source configured to emit a first illumination light having a first color, a second illumination light having a second color, and a third illumination light having a third color. Each of the first color, the second color, and the third color are different from one another. The barcode reader also includes a controller configured to cause the illumination source to sequentially 1) illuminate an object with the first illumination light and cause the image capture arrangement to capture first monochrome image data while the object is illuminated with the first illumination light; 2) illuminate the object with the second illumination light and cause the image capture arrangement to capture second monochrome image data while the object is illuminated with the second illumination light; and 3) illuminate the object with the third illumination light and cause the image capture arrangement to capture third monochrome image data while the object is illuminated with the third illumination light. The controller is configured to process the first monochrome image data, the second monochrome image data, and the third monochrome image data to determine a color associated with the object.

In a variation of the first example, the illumination assembly is disposed within at least one of the first housing portion or the second housing portion. In a further variation of the first example, the illumination source includes a first illumination source and a second illumination source. The first illumination source is to emit the first illumination light and the second illumination source is to emit the second illumination light and the third illumination light. The first illumination source is disposed within the housing. In a further variation of the first example, the controller is configured to cause the illumination source to sequentially illuminate the object and is configured to cause the image capture arrangement to capture the first monochrome image data, the second monochrome image data, and the third monochrome image data in response to the object being stabilized within a product scanning region of the barcode reader. In a further variation of the first example, the controller is configured to cause the illumination source to sequentially illuminate the object and is configured to cause the image capture arrangement to capture the first monochrome image data, the second monochrome image data, and the third monochrome image data in response to a trigger event occurring.

In a further variation of the first example, the controller is configured to further process the first monochrome image data, the second monochrome image, and the third monochrome image data to identify movement of the object and to compensate for the movement. In a further variation of the first example, the controller is configured to compensate for the movement by shifting the object within at least one of the first monochrome image data, the second monochrome image data, or the third monochrome image data to enable a position of the object within the first monochrome image data, the second monochrome image data, and the third monochrome image data to substantially align. In a further variation of the first example, the controller is configured to compensate for the movement by applying a filter to at least one of the first monochrome image data, the second monochrome image data, or the third monochrome image data. In a further variation of the first example, the controller is configured to determine the color associated with the object by generating a color vector of the object based on the first monochrome image data, the second monochrome image data, and the third monochrome image data and comparing the color vector to reference data.

In a second example, a barcode reader includes an illumination assembly. The illumination assembly includes an illumination source configured to emit a first illumination light having a first color, a second illumination light having a second color, and a third illumination light having a third color. Each of the first color, the second color, and the third color being different from one another. The barcode reader also includes an imaging assembly including image capture components. The barcode also includes a controller configured to cause the illumination assembly to illuminate an object with the first illumination light, the second illumination light, and the third illumination light and configured to cause the imaging assembly to capture monochrome image data when the illumination assembly illuminates the object with the first illumination light, the second illumination light, and the third illumination light.

In a variation of the second example, the controller is configured to monitor movement of the object during an image capture time period and, in response to a dwell in the movement being identified, the controller is configured to cause the illumination assembly to illuminate the object with the first illumination light, the second illumination light, and the third illumination light and is configured to cause the imaging assembly to capture the monochrome image data. The monochrome image data includes first monochrome image data, second monochrome image data, and third monochrome image data. The controller is configured to cause the illumination source to sequentially 1) illuminate the object with the first illumination light and cause the imaging assembly to capture the first monochrome image data while the object is illuminated with the first illumination light; 2) illuminate the object with the second illumination light and cause the imaging assembly to capture the second monochrome image data while the object is illuminated with the second illumination light; and 3) illuminate the object with the third illumination light and cause the imaging assembly to capture third monochrome image data while the object is illuminated with the third illumination light. The controller is configured to process the first monochrome image data, the second monochrome image data, and the third monochrome image data to determine a color associated with the object.

In a further variation of the second example, the monochrome image data includes first monochrome image data associated with the first illumination light, second monochrome image data associated with the second illumination light, and third monochrome image data associated with the third illumination light. The controller is configured to process the first monochrome image data, the second monochrome image data, and the third monochrome image data and is configured to identify and compensate for movement of the object to enable a position of the object within the first monochrome image data, the second monochrome image data, and the third monochrome image data to substantially align. In a further variation of the second example, the controller is configured to process the monochrome image data to determine a color associated with the object. In a further variation of the second example, the controller is configured to cause the illumination assembly to emit the first illumination light, the second illumination light, and the third illumination light substantially simultaneously and for the imaging assembly to capture the monochrome image data when the object is being illuminated by the first illumination light, the second illumination light, and the third illumination light, the controller is configured to decode barcode data.

In a third example, a barcode reader includes a housing and an illumination assembly disposed in the housing. The illumination assembly includes an illumination source configured to emit a first illumination light having a first color, a second illumination light having a second color, and a third illumination light having a third color. Each of the first color, the second color, and the third color are different from one another. The barcode reader also includes an imaging assembly including image capture components. The barcode reader also includes a controller configured to cause the illumination source to sequentially 1) illuminate an object with the first illumination light and cause the imaging assembly to capture first monochrome image data while the object is illuminated with the first illumination light; 2) illuminate the object with the second illumination light and cause the imaging assembly to capture second monochrome image data while the object is illuminated with the second illumination light; and 3) illuminate the object with the third illumination light and cause the imaging assembly to capture third monochrome image data while the object is illuminated with the third illumination light. The controller is configured to process the first monochrome image data, the second monochrome image data, and the third monochrome image data to determine a color associated with the object.

In a variation of the third example, the controller is configured to monitor movement of the object within a product scanning region of the barcode reader during an image capture time period and is configured to cause the imaging assembly to capture the first monochrome image data, the second monochrome image data, and the third monochrome image data during the image capture time period in response to a dwell in the movement being identified. In a further variation of the third example, the controller is configured to generate a trigger to cause the illumination source to illuminate the object with the first illumination light, the second illumination light, and the third illumination light and is configured to cause the imaging assembly to capture the first monochrome image data, the second monochrome image data, and the third monochrome image data. In a further variation of the third example, the controller is configured to process the first monochrome image data, the second monochrome image data, and the third monochrome image data and is configured to identify and compensate for movement of the object within at least one of the first monochrome image data, the second monochrome image data, or the third monochrome image data to enable a position of the object within the first monochrome image data, the second monochrome image data, and the third monochrome image data to substantially align.

Figure 1:
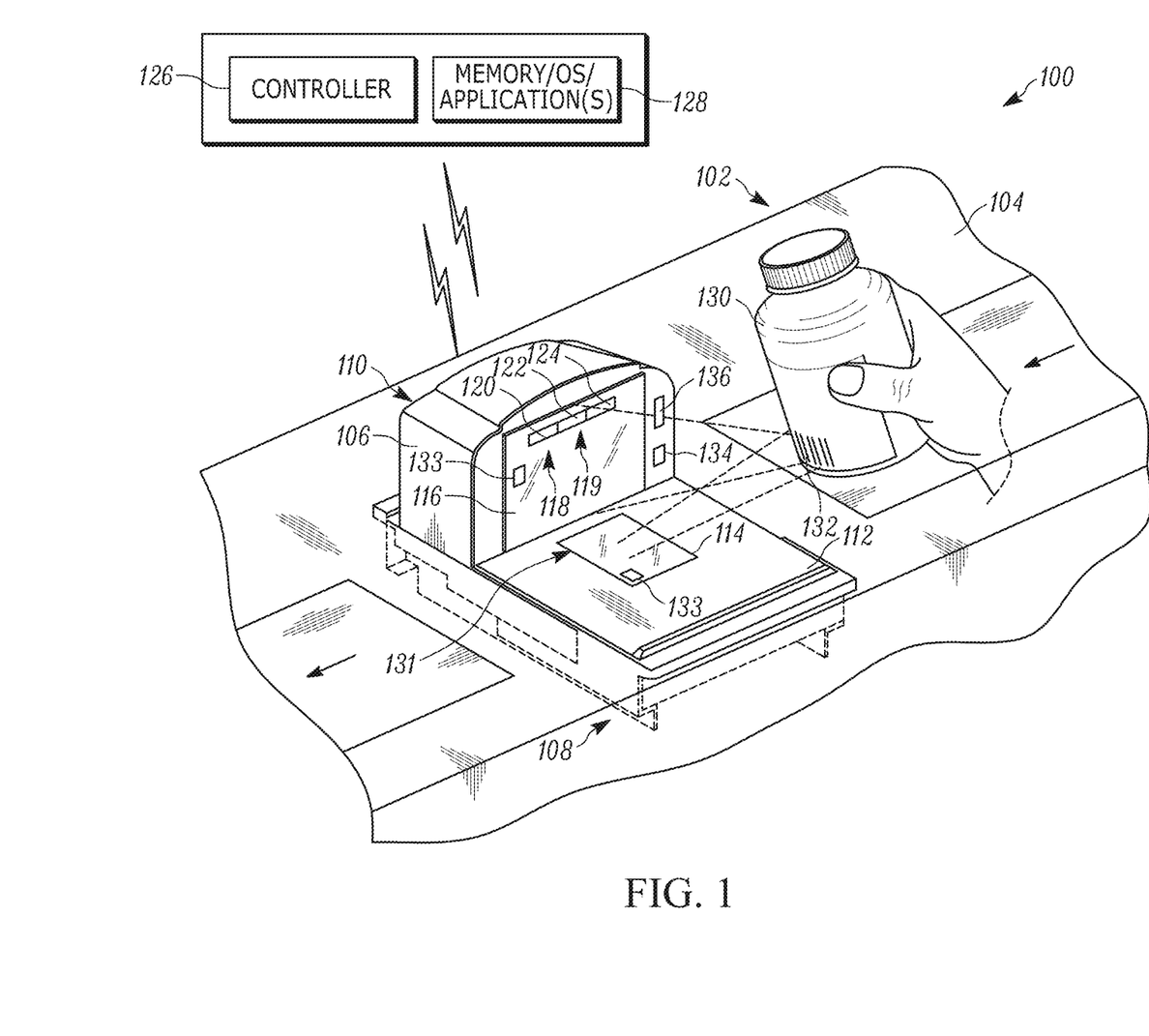
FIG. 1 illustrates a perspective view of an example checkout workstation in accordance with the teachings of this disclosure.

Referring now to the drawings, FIG. 1 illustrates a perspective view of a point-of-sale (POS) system 100. The POS system 100 is often managed by a store employee such as a clerk. However, in other cases the POS system 100 may be a part of a so-called self-checkout lane where instead of a clerk, a customer is responsible for checking out his or her own products.

The POS system 100 is shown having a workstation 102 with a counter 104 and a bi-optical (also referred to as "bi-optic") barcode reader 106. The barcode reader 106 includes a lower housing (a first housing portion) 108 and a raised housing (a second housing portion) 110.

The lower housing 108 includes a top portion (a generally horizontal platter) 112 with a first optically transmissive window (a generally horizontal window) 114 positioned therein along a generally horizontal plane relative to the overall configuration and placement of the barcode reader 106. In some embodiments, the top portion 112 may include a removable or a non-removable platter (e.g., a weighing platter). The top portion 112 can also be viewed as being positioned substantially parallel with the counter 104 surface. As set forth herein, the phrase "substantially parallel" means +/−10° of parallel and/or accounts for manufacturing tolerances. It is worth noting that while, in FIG. 1, the counter 104 and the top portion 112 are illustrated as being about co-planar, that does not have to be the case for the top portion (the platter) 112 and the counter 104 to be considered substantially parallel. In some instances, the counter 104 may be raised or lowered relative to the top surface of the top portion 112, where the top portion 112 is still viewed as being positioned substantially parallel with the counter 104 surface.

The raised housing 110 is configured to extend above the top portion 112. The raised housing 110 includes a second optically transmissive window (a generally vertical window) 116. The second optically transmissive window 116 is positioned in a generally upright plane relative to the top portion 112 and/or the first optically transmissive window 114. Note that references to "upright" include, but are not limited to, vertical. Thus, as an example, something that is upright may deviate from a vertical axis/plane by as much as 45 degrees. The raised portion 110 also includes an example illumination assembly 118. The illumination assembly 118 includes an illumination source 119 configured to emit a first illumination light 120 having a first color (e.g., red), a second illumination light 122 having a second color (e.g., green) and a third illumination light 124 having a third color (e.g., blue). The first color, the second color and the third color are different from one another.

The POS system 100 also includes a controller 126 and a memory 128. The controller 126 and/or the memory 128 are in communication with the barcode reader 106. In some examples, the controller 126 and/or the memory 128 are disposed within the barcode reader 106. In other examples, the controller 126 and/or the memory 128 are spaced from the barcode reader 106.

In operation, the controller 126 causes the illumination assembly 118 to illuminate when a product (an object) 130 is swiped past the barcode reader 106. The product 130 is shown being a bottle. To enable a barcode 132 to be more easily digitally read through at least one of the first and second optically transmissive windows 114, 116, the controller 126 causes the first illumination light 120 to illuminate. This is particularly done by positioning the product 130 within the field of views (FsOV) of an image capture arrangement 173 (See, FIGS. 2-3) and the controller 126 decoding the barcode 132 appearing in at least one of the FsOV of the barcode scanner 106. In the illustrated example, the image capture arrangement 173 is implemented by a monochrome sensor(s) and does not include a color sensor(s).

To enable a color image of the product 130 to be generated using the image capture arrangement 173, the controller 126 causes the illumination source 118 to sequentially illuminate the product 130 with the respective light sources 120, 122, 124 and to capture monochrome image data while the product 130 is being illuminated. For example, the controller 126 causes the product 130 to be illuminated with the first illumination light 120 while first monochrome image data is captured via the image capture arrangement 173. After the first monochrome image data is obtained, the controller 126 causes the product 130 to be illuminated with the second illumination light 122 while second monochrome image data is captured via the image capture arrangement 173. After the second monochrome image data is obtained, the controller 126 causes the product to be illuminated with the third illumination light 124 while third monochrome image data is captured via the image capture arrangement 173. The first, second and third image data can be stored in the memory 128.

To remove ambient light from the first, second and third image data, in some examples, the controller 126 causes the image capture arrangement 173 (FIG. 2) to obtain fourth monochrome image data without the product 130 being illuminated. The fourth image data can be stored in the memory 128. Thereafter and using the fourth image data, the controller 126 subtracts the ambient light from the first image data, the second image data and the third image data. Regardless if the fourth image data is obtained to account for ambient light, the controller 126 processes the first, second and third image data to generate a color image. A color associated with the product 130 can be determined from the color image. For example, the controller 126 can determine a color associated with the product 130 by generating a color vector of the product 130 based on the first image data, the second image data and the third image data and comparing the color vector to reference data stored in the memory 128.

Prior to the first, second and third image data being captured, in some examples, the controller 126 determines that the product 130 is stabilized within a product scanning region 131 of the barcode scanner 106. The controller 126 can determine that the product 130 is stabilized in response to a trigger event occurring. Some trigger events include a dwell in a weight of the product 130 on the top portion 112 of the lower housing 108 and/or a dwell identified in data captured by infrared proximity sensors 133. As shown, one of the infrared sensors 133 is positioned behind the first window 114 and a second one of the infrared sensors 133 is positioned behind the second window 116. Additionally or alternatively, some trigger events are associated with a manual input being received based on a button 134 being pressed and/or an audio input being received at a microphone 136.

While the POV system 100 is configured to capture the first, second and third image data in response to the product 130 being stabilized, in some examples, movement of the product 130 occurs between the first image being captured, the second image being captured and/or the third image being captured. In some examples, the controller 126 determines that the product 130 has moved by comparing the relative position of the product 130 between frames associated with the first, second and third image data.

To compensate for the movement of the product 130 being the frames, when identified, the controller 126 shifts the product 130 within at least one of the first image data, the second image data or the third image data. Shifting the position of the product 130 enables a position of the product 130 within the first monochrome image data, the second monochrome image data, and the third monochrome image data to substantially align. Additionally or alternatively, the controller 126 can compensate for the movement of the product 130 by applying a filter to at least one of the first image data, the second image data or the third image data.

Figure 2:
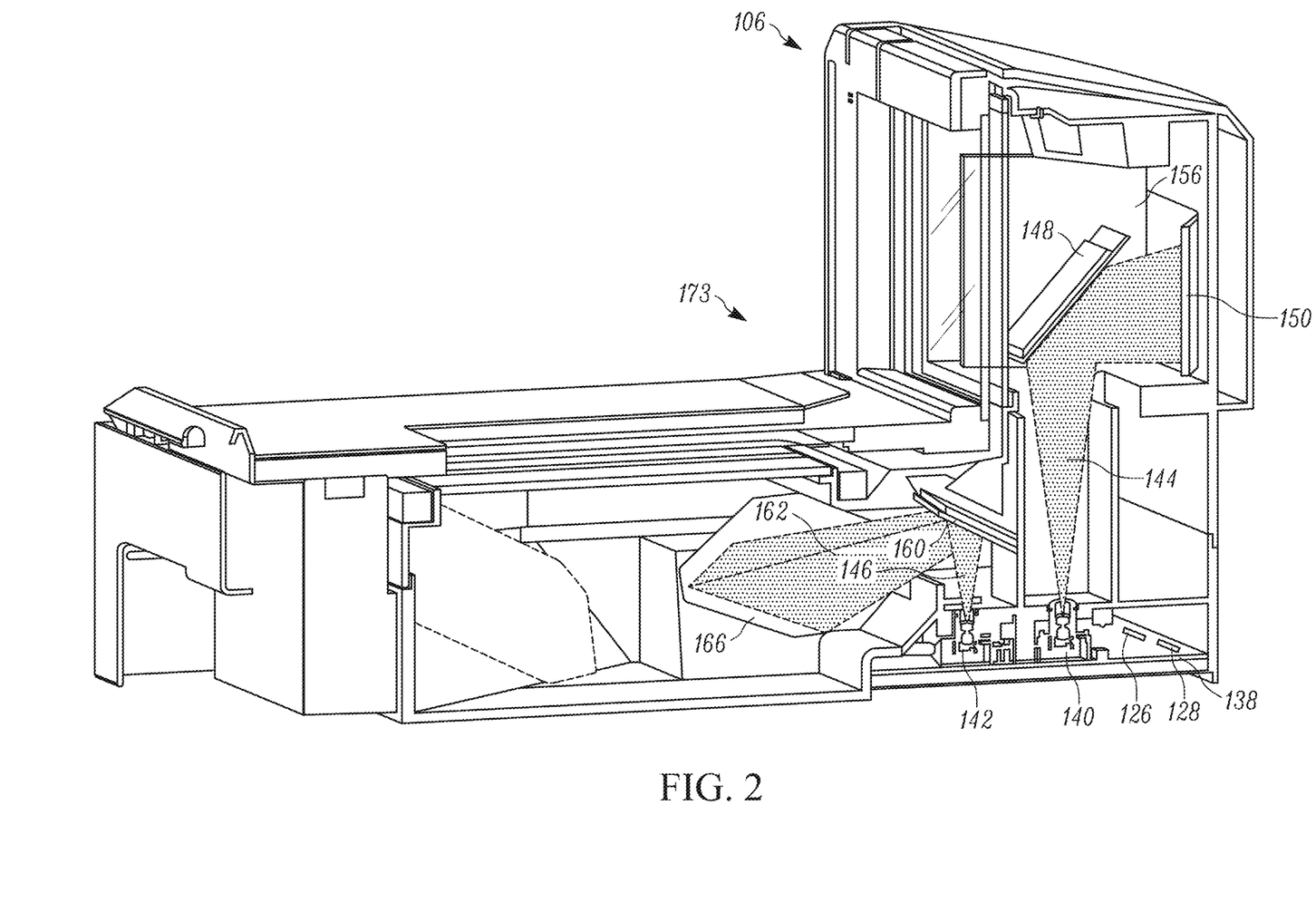
FIG. 2 illustrates a cross-sectional perspective view of an example barcode reader of the checkout workstation of FIG. 1.

FIG. 2 illustrates a cross-sectional perspective view of the barcode reader 106 of FIG. 1. To enable imaging data to be obtained by the barcode reader 106, the barcode reader 106 includes a printed circuit board (PCB) 138 with a first imaging assembly 140 and a second imaging assembly 142. The imaging assemblies 140, 142 may be referred to as cameras or imager assemblies. The PCB 138 and/or the imaging assemblies 140, 142 are associated with the controller 126. Each of the imaging assemblies 140, 142 includes an imaging sensor having a plurality of photosensitive elements that define a substantially flat surface along with other components such as a housing and lens(es) for capturing image data for a FOV. The arrangement and configuration of the components including the imaging sensor, the photosensitive elements, the housing, the lens(es) define a specific FOV for each of the imaging assemblies 140, 142. As shown, the first imaging assembly 140 and its imaging sensor are configured to capture image data over a first field of view (FOV) 144 and the second imaging assembly 142 and its imaging sensor are configured to capture image data over a second field of view (FOV) 146. Each field of view (e.g., 144, 146) may be considered a sub-field of view of an underlying field of view. In other words, a first field of view of an imager may be split into multiple fields of view also referred to as sub-fields of view using a splitter mirror(s) positioned within the path of the first fields of view. Thus, any imaging assembly associated with a field of view may not be exclusive to that field of view.

Figure 3:
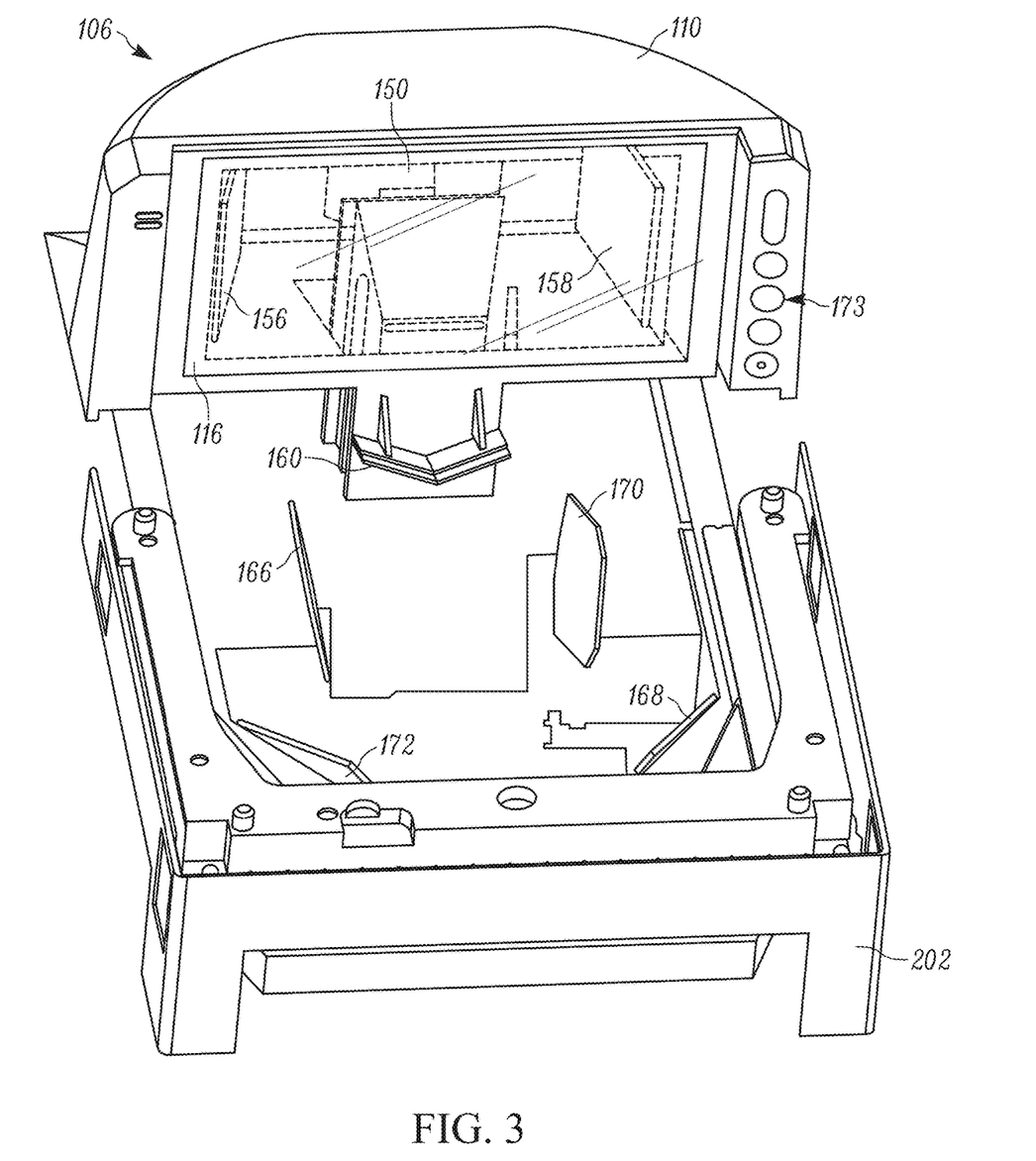
FIG. 3 illustrates a partial interior perspective view of the barcode reader of FIG. 1.
Figure 4:
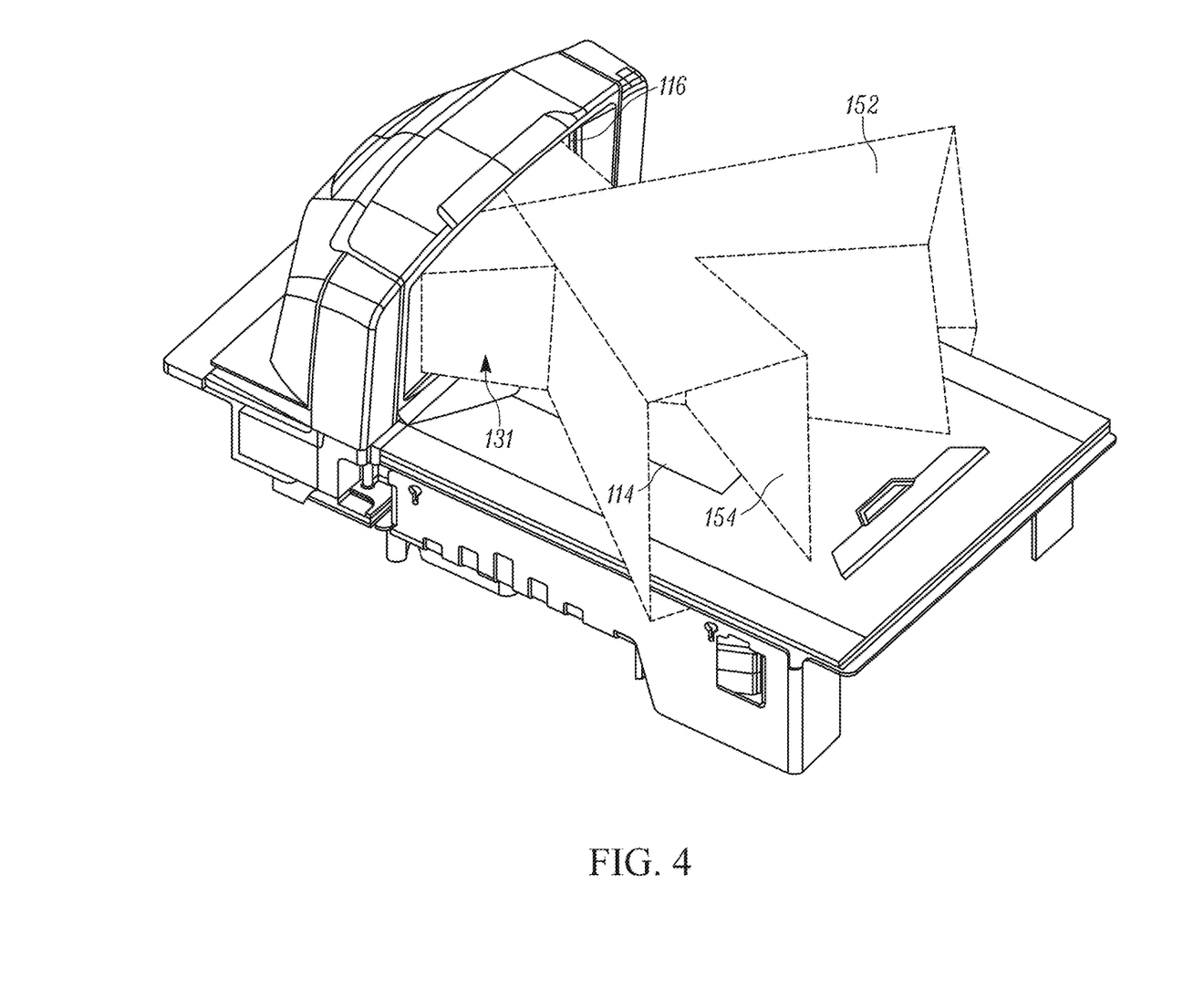
FIG. 4 illustrates example first and second sub-fields of view projecting from a generally vertical window of the barcode reader of FIG. 1.

Referring to FIGS. 2-5 and to alter and redirect the first FOV 144 to achieve desired functionality, the barcode reader 106 includes a first fold mirror 148 positioned to redirect the first FOV 144 toward a first splitter mirror 150. The first splitter mirror 150 is structured and positioned to split the first FOV 144 into a first sub FOV 152 (FIG. 4) and a second sub FOV 154 (FIG. 4). The first sub FOV 152 is directed toward a second fold mirror 156 and the second sub FOV 154 is directed toward a third fold mirror 158 (FIG. 3). The second fold mirror 156 redirects the first sub FOV 152 out of the second window 116 as shown in FIG. 4 and the third fold mirror 158 redirects the second sub FOV 154 out of the second window 116 as shown in FIG. 4. In the illustrated example, the first imaging assembly 140 is configured to produce the first FOV 144 and the mirrors 148, 150, 156, 158 are at least partially positioned in the second housing portion 110 to direct the first and second sub FsOV 152, 154 through the second window 116 as shown in FIG. 4. Put another way, the mirrors 148, 150, 156, 158 and the first imaging assembly 140 are configured to capture barcode data through the second window 116. Additionally, the mirrors 148, 150, 156, 158 and the first imaging assembly 140 are configured to capture image data that can be used to generate color images and/or to determine a color associated with the product 130. The mirrors 148, 150, 156, 158 and/or the first imaging assembly 140 may be referred to as optical components.

Figure 5:
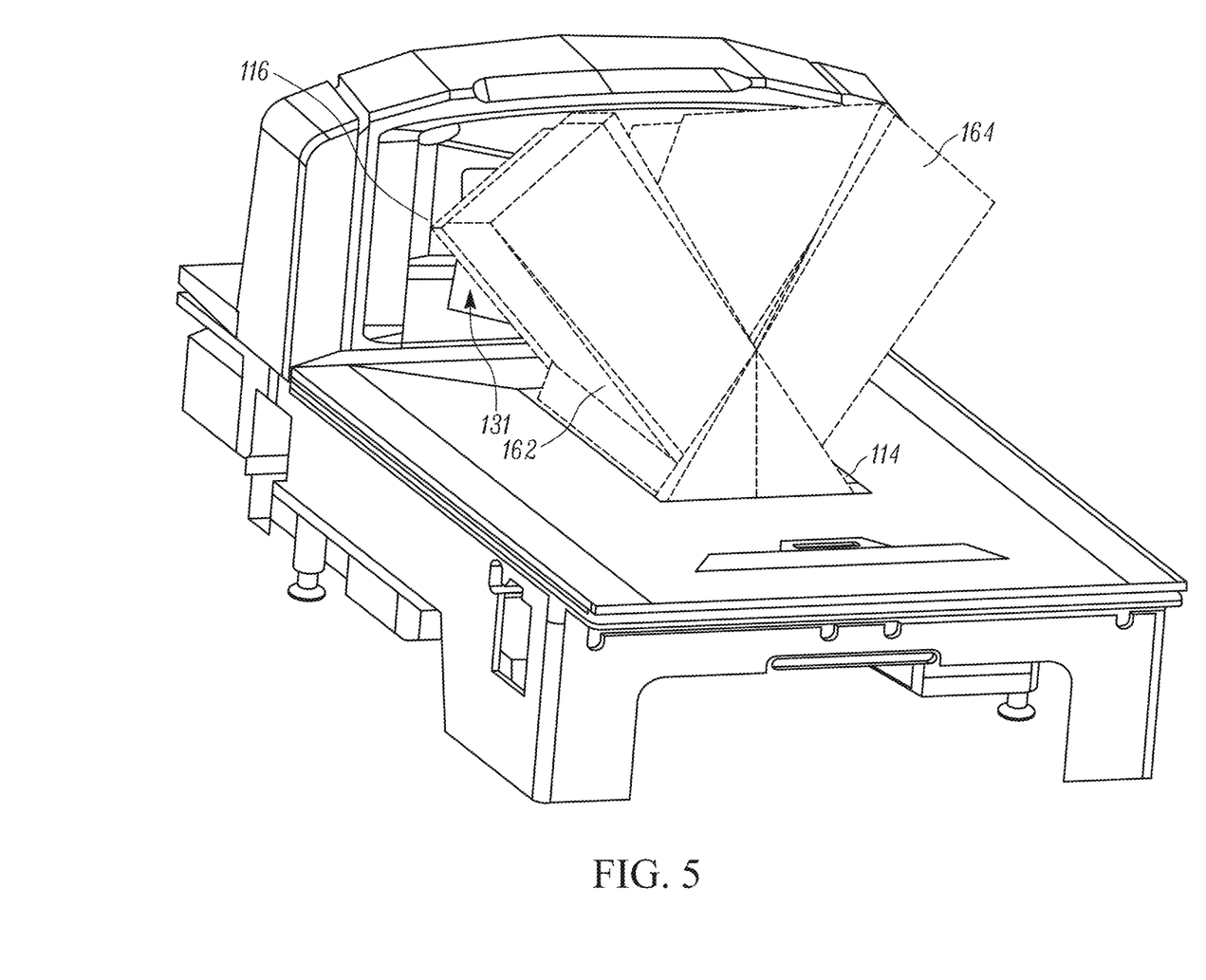
FIG. 5 illustrates example third and fourth sub-fields of view projecting from a generally horizontal window of the barcode reader of FIG. 1.

Similarly, to alter and redirect the second FOV 146, the barcode reader 106 includes a second splitter mirror 160. The second splitter mirror 160 is structured and positioned to split the second FOV 146 into a third sub field of view 162 and a fourth sub FOV 164 (FIG. 5). The third sub FOV 162 is directed toward a third fold mirror 166 which directs the third sub FOV 162 to a fourth fold mirror 168 (FIG. 3). The fourth fold mirror 168 is structured and positioned to redirect the third sub FOV 162 out of the first window 114 as shown in FIG. 5. The fourth sub FOV 164 is directed toward a fifth fold mirror 170 (FIG. 3) which directs the fourth sub FOV 164 to a sixth fold mirror 172 (FIG. 3). The sixth fold mirror 172 redirects the fourth sub FOV 164 out of the first window 114 as shown in FIG. 5. In the illustrated example, the second imaging assembly 142 is configured to produce the second FOV 146 and the mirrors 166, 168, 170, 172 are at least partially positioned in the first housing portion 202 to direct the third and fourth sub FsOV 162, 164 through the first window 114. Put another way, the mirrors 160, 166, 168, 170, 172 and the second imaging assembly 142 are configured to capture barcode data through the first window 114. Additionally, the mirrors 166, 168, 170, 172 are configured to capture image data that can be used to generate color images and/or to determine a color associated with a product 130. The mirrors 166, 168, 170, 172 and/or the second imaging assembly 142 may be referred to as optical components. The mirrors 148, 150, 156, 166, 158, 166, 168, 170, 172 and the first and second imaging assemblies 140, 142 may be referred to as an image capture arrangement 173. While the mirrors 148, 150, 156, 166, 158, 168, 170, 172 are shown in a particular arrangement, the precise angle and position of the mirrors 148, 150, 156, 166, 158, 168, 170, 172 can be varied to achieve a desired FOV path direction.

To enable image data acquired by the imaging assemblies 140, 142 to be detected and/or decoded and to enable a color of the product 130 to be determined, the PCB 138 includes the controller 126 and the memory 128. In operation, the data acquired by the imaging assemblies 140, 142 is transmitted or otherwise accessed by the controller 126, where the data is processed and/or analyzed in an effort to detect and decode a valid barcode(s), for example. Further, in operation, to determine a color of the product 130, the data acquired by the imaging assemblies 140, 142 when the product 130 is illuminated by the illumination lights 120, 122, 124 is processed and/or analyzed in an effort to detect and/or determine a color associated with the product 130 or to otherwise generate a color image from monochrome image data.

FIG. 3 illustrates a partial interior perspective view of the barcode reader 106 of FIG. 2. As shown, the first splitter mirror 150 is arranged to split the first FOV 144 into the first sub FOV 152 directed toward the second fold mirror 156 and the second sub FOV 154 directed toward the third fold mirror 158. The second and third fold mirrors 156, 158 are illustrated being positioned to direct the first and second sub FsOV 152, 154 out of the second window 116.

As also shown, the second splitter mirror 160 is arranged to split the second FOV 146 into the third sub FOV 162 directed toward the third fold mirror 166 and the fourth sub FOV 164 directed toward the fifth fold mirror 170. To direct the third and fourth sub FsOV 162, 164 out of the first window 114 or, more generally, out of the barcode reader 106, the third fold mirror 166 is shown positioned to direct the third sub FOV 162 to the fourth fold mirror 168 which directs the third sub FOV 162 out of the first window 114 and the fifth fold mirror 170 is shown positioned to direct the fourth sub FOV 164 to the sixth fold mirror 172 which directs the fourth sub FOV 164 out of the first window 114.

FIG. 4 illustrates the first and second sub FsOV 152, 154 projecting from the second window 116 of the barcode reader 106 of FIG. 2. In the currently described embodiment, the fold mirrors 156, 158 are positioned such that the first sub-FOV 152 and the second sub-FOV 154 intersect above the first window 114 and in the product-scanning region 131 of the barcode reader 106. The product-scanning region 131 is the general area where the product 130 is expected to be presented for image capture by the barcode reader 106. In some cases, the fold mirrors 156, 158 can be arranged to cause the first sub-FOV 152 and the second sub-FOV 154 to intersect partially. In other instances, the fold mirrors 156, 158 can be arranged to cause the first sub-FOV 152 and the second sub-FOV 154 to intersect fully. In still other instances, the fold mirrors 156, 158 can be arranged to cause a centroidal axis of each of the first sub-FOV 152 and the second sub-FOV 154 to intersect with or without regard for the cross-sectional dimensions of the FsOV.

FIG. 5 illustrates the third and fourth sub FsOV 162, 164 projecting from the first window 114 of the barcode reader 106. In the currently described embodiment, the fold mirrors 166, 168, 170, 172 are positioned such that the third sub FOV 162 and the fourth sub FOV 164 intersect in front of the second window 116 and in the product-scanning region 406 of the barcode reader 106. In some cases, the fold mirrors 166, 168, 170, 172 can be arranged to cause the third sub FOV 162 and the fourth sub FOV 164 to intersect partially. In other instances, the fold mirrors 166, 168, 170, 172 can be arranged to cause the first sub-FOV 152 and the second sub-FOV 154 to intersect fully. In still other instances, the fold mirrors 156, 158 can be arranged to cause a centroidal axis of each of the first sub-FOV 152 and the second sub-FOV 154 to intersect with or without regard for the cross-sectional dimensions of the FsOV.

Figure 6:
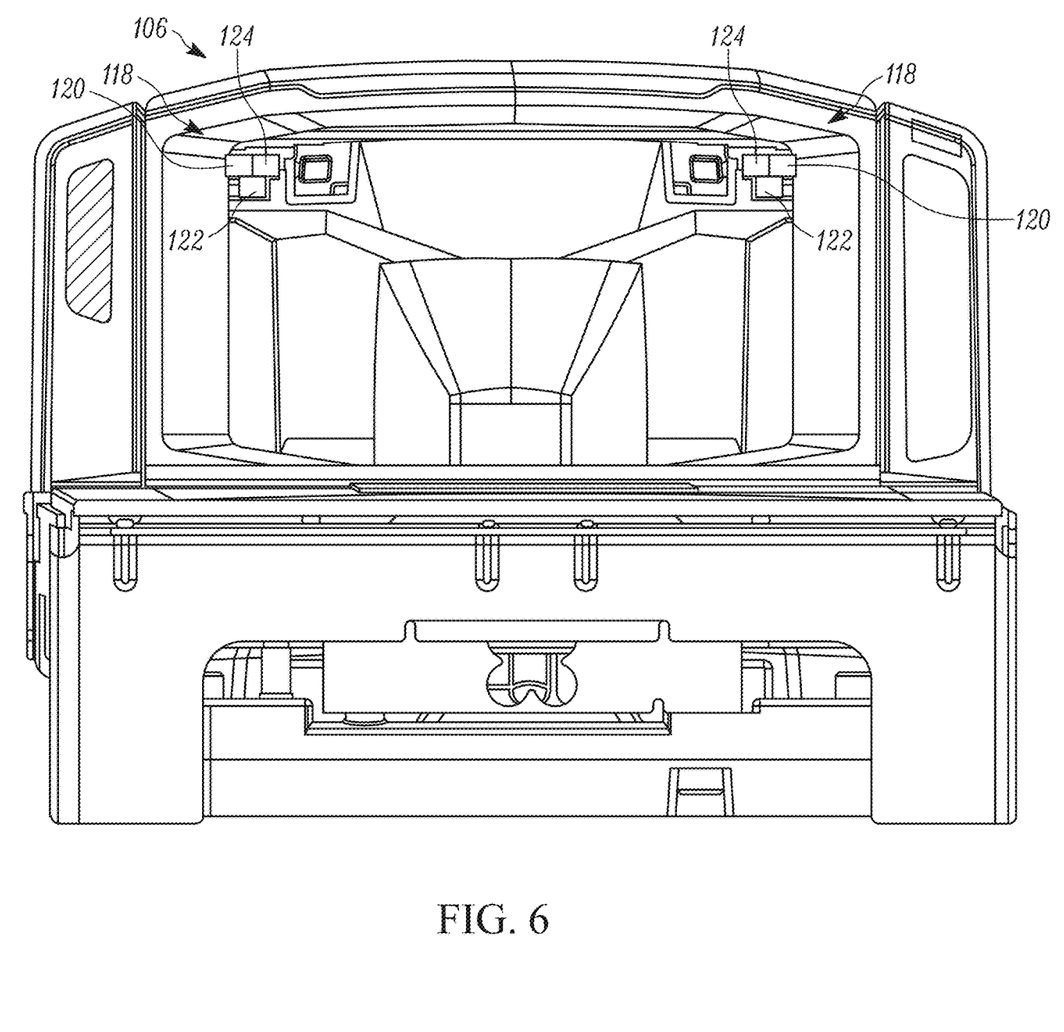
FIG. 6 illustrates a front view of the barcode reader of FIG. 1 illustrating an example illumination assembly.

FIG. 6 illustrates a front view of the barcode reader 106. As shown, the barcode reader 106 includes the illumination assembly 118 including two of the first illumination lights 120, two of the second illumination lights 122 and two of the third illumination lights 124. In this example, each of the first illumination lights 120 are spaced from one another, each of the second illumination lights 122 are spaced from one another and each of the third illumination lights 124 are spaced from one another.

Figure 7:
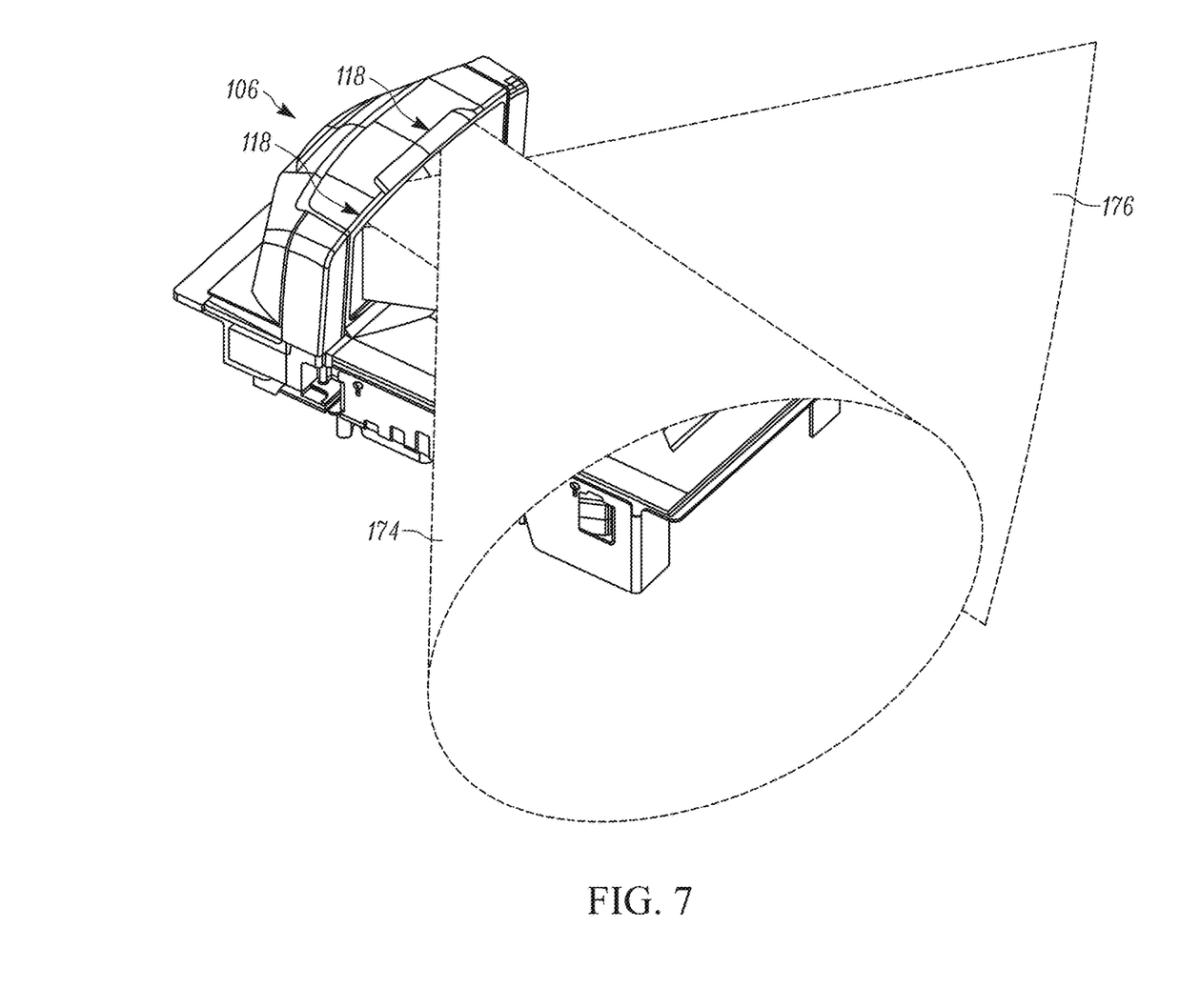
FIG. 7 illustrates the barcode reader of FIG. 1 emitting illumination light in accordance with the teachings of this disclosure.

FIG. 7 illustrates the illumination assembly 118 emitting first and second beams 174, 176 of illumination light.

Figure 8:
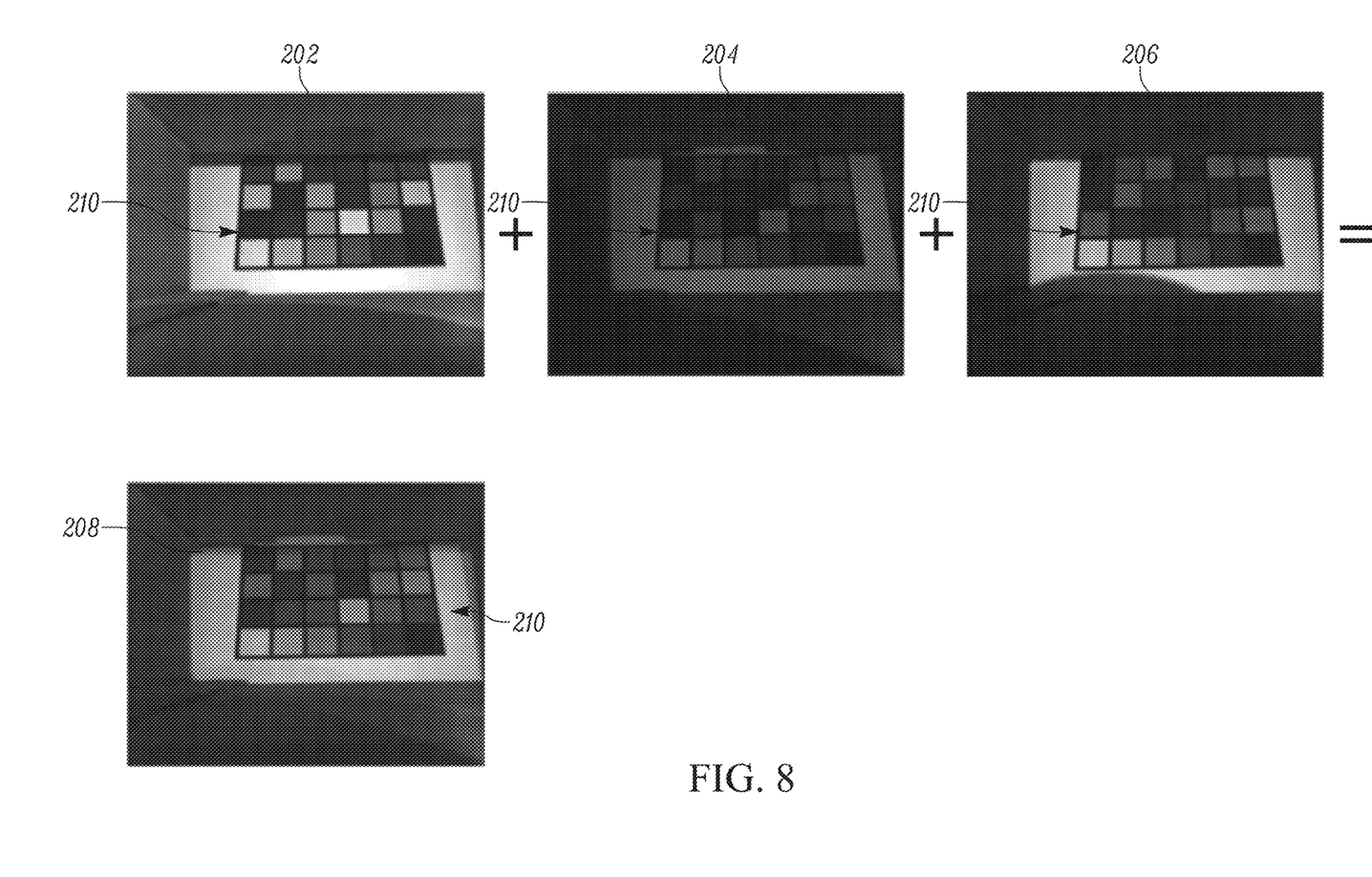
FIG. 8 illustrates a flow diagram of a process of generating an example color image using monochrome image data in accordance with the teachings of this disclosure.

FIG. 8 illustrates a process of combining a first monochromatic image 202, a second monochromatic image 204 and a third monochromatic image 206 together to generate a color image 208. In this example, the first monochromatic image 202 is obtained when an object 210 is illuminated using red light, the second monochromatic image 204 is obtained when the object 210 is illuminated using green light and the third monochromatic image 206 is obtained when the object is illuminated using blue light. To generate the color image 208, the monochromatic images 202, 204, 206 (red, green, blue) are assigned color channels of a single color image.

From the foregoing, it will be appreciated that the above disclosed apparatus, methods and articles of manufacture enable color images to be generated using monochrome sensors. As a result, higher image resolution images can be obtained than if color sensors were instead used. Moreover, the monochrome sensors used to implement the teachings of this disclosure can obtain these high resolution images in lower light conditions than if color sensor were used. In fact, color sensors may require four times more light to obtain images having resolution that meets a threshold. Further, by implementing the barcode scanners with the teachings of this disclosure, barcode scanners can be produced that are less expensive than if color sensors were included while still enabling the color(s) of a product(s) to be determined during the checkout process.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations. Moreover, no steps of any method disclosed herein shall be understood to have any specific order unless it is expressly stated that no other order is possible or required by the remaining steps of the respective method. Also, at least some of the figures may or may not be drawn to scale.

The benefits, advantages, solutions to problems, and any element(s) that may cause any benefit, advantage, or solution to occur or become more pronounced are not to be construed as a critical, required, or essential features or elements of any or all the claims. The legal scope of the property right is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A barcode reader configured to be supported by a workstation, the barcode reader comprising:
   a first housing portion supporting a generally horizontal platter having a generally horizontal window;
   a second housing portion supporting a generally vertical window;
   an image capture arrangement having a first set of optical components and a second set of optical components,
      the first set of optical components are positioned at least partially within the first housing portion, the first set of optical components are configured to direct a first field of view (FOV) through the generally horizontal window; and
      the second set of optical components are positioned at least partially within the second housing portion, the second set of optical components are configured to direct a second FOV through the generally vertical window;
   an illumination assembly, the illumination assembly including an illumination source configured to emit a first illumination light having a first color, a second illumination light having a second color, and a third illumination light having a third color, each of the first color, the second color, and the third color being different from one another; and
   a controller configured to
      determine that an object is stabilized within a scanning region of the barcode reader;
      in response to determining that the object is stabilized, cause the illumination source to sequentially 1) illuminate the object with the first illumination light and cause the image capture arrangement to capture first monochrome image data while the object is illuminated with the first illumination light; 2) illuminate the object with the second illumination light and cause the image capture arrangement to capture second monochrome image data while the object is illuminated with the second illumination light; and 3) illuminate the object with the third illumination light and cause the image capture arrangement to capture third monochrome image data while the object is illuminated with the third illumination light; and
      process the first monochrome image data, the second monochrome image data, and the third monochrome image data to determine a color associated with the object.

2. The barcode reader of claim 1, wherein the illumination assembly is disposed within at least one of the first housing portion or the second housing portion.

3. The barcode reader of claim 1, wherein the illumination source includes a first illumination source and a second illumination source, the first illumination source to emit the first illumination light and the second illumination source to emit the second illumination light and the third illumination light, the first illumination source disposed within the housing.

4. The barcode reader of claim 1, wherein the controller is to configured to decode barcode data appearing in at least one of the first FOV or the second FOV.

5. The barcode reader of claim 1, wherein the controller is configured to cause the illumination source to sequentially illuminate the object and is configured to cause the image capture arrangement to capture the first monochrome image data, the second monochrome image data, and the third monochrome image data in response to the object being stabilized within a product scanning region of the barcode reader.

6. The barcode reader of claim 1, wherein the controller determines that the object is stabilized based on at least one of a dwell of a weight of the object on the platter, a dwell identified by an infrared proximity sensor system, a manual input, or an audio input.

7. The barcode reader of claim 1, wherein the controller is configured to further process the first monochrome image data, the second monochrome image, and the third monochrome image data to identify movement of the object and to compensate for the movement.

8. The barcode reader of claim 7, wherein the controller is configured to compensate for the movement by shifting the object within at least one of the first monochrome image data, the second monochrome image data, or the third monochrome image data to enable a position of the object within the first monochrome image data, the second monochrome image data, and the third monochrome image data to substantially align.

9. The barcode reader of claim 7, wherein the controller is configured to compensate for the movement by applying a filter to at least one of the first monochrome image data, the second monochrome image data, or the third monochrome image data.

10. The barcode reader of claim 1, wherein the controller is configured to determine the color associated with the object by generating a color vector of the object based on the first monochrome image data, the second monochrome image data, and the third monochrome image data and comparing the color vector to reference data.

11. A barcode reader, comprising:
    an illumination assembly, the illumination assembly including an illumination source configured to emit a first illumination light having a first color, a second illumination light having a second color, and a third illumination light having a third color, each of the first color, the second color, and the third color being different from one another;
    an imaging assembly including image capture components; and
    a controller configured to:
       determine that an object is stabilized within a scanning region of the barcode reader; and
       in response to determining that the object is stabilized, cause the illumination assembly to illuminate the object with the first illumination light, the second illumination light, and the third illumination light and configured to cause the imaging assembly to capture monochrome image data when the illumination assembly illuminates the object with the first illumination light, the second illumination light, and the third illumination light.

12. The barcode reader of claim 11, wherein the monochrome image data includes first monochrome image data, second monochrome image data, and third monochrome image data, and wherein the controller is configured to cause the illumination source to sequentially 1) illuminate the object with the first illumination light and cause the imaging assembly to capture the first monochrome image data while the object is illuminated with the first illumination light; 2) illuminate the object with the second illumination light and cause the imaging assembly to capture the second monochrome image data while the object is illuminated with the second illumination light; and 3) illuminate the object with the third illumination light and cause the imaging assembly to capture third monochrome image data while the object is illuminated with the third illumination light, the controller is configured to process the first monochrome image data, the second monochrome image data, and the third monochrome image data to determine a color associated with the object.

13. The barcode reader of claim 11, wherein the controller determines that the object is stabilized based on at least one of a dwell in a weight of the object on a platter of the barcode reader, and a dwell identified by an infrared proximity sensor system.

14. The barcode reader of claim 11, wherein the monochrome image data includes first monochrome image data associated with the first illumination light, second monochrome image data associated with the second illumination light, and third monochrome image data associated with the third illumination light, and wherein the controller is configured to process the first monochrome image data, the second monochrome image data, and the third monochrome image data and is configured to identify and compensate for movement of the object to enable a position of the object within the first monochrome image data, the second monochrome image data, and the third monochrome image data to substantially align.

15. The barcode reader of claim 11, wherein the controller is configured to process the monochrome image data to determine a color associated with the object.

16. The barcode reader of claim 11, wherein the controller is configured to cause the illumination assembly to emit the first illumination light, the second illumination light, and the third illumination light substantially simultaneously and for the imaging assembly to capture the monochrome image data when the object is being illuminated by the first illumination light, the second illumination light, and the third illumination light, the controller is configured to decode barcode data.

17. A barcode reader, comprising:
  a housing;
  an illumination assembly disposed in the housing, the illumination assembly including an illumination source configured to emit a first illumination light having a first color, a second illumination light having a second color, and a third illumination light having a third color, each of the first color, the second color, and the third color being different from one another;
  an imaging assembly including image capture components; and
  a controller configured to:
    determine that an object is stabilized within a scanning region of the barcode reader;
    in response to determining that the object is stabilized, cause the illumination source to sequentially 1) illuminate the object with the first illumination light and cause the imaging assembly to capture first monochrome image data while the object is illuminated with the first illumination light; 2) illuminate the object with the second illumination light and cause the imaging assembly to capture second monochrome image data while the object is illuminated with the second illumination light; and 3) illuminate the object with the third illumination light and cause the imaging assembly to capture third monochrome image data while the object is illuminated with the third illumination light; and
    process the first monochrome image data, the second monochrome image data, and the third monochrome image data to determine a color associated with the object.

18. The barcode reader of claim 17, wherein the controller is configured to determine that the object is stabilized based on at least one of: 1) a dwell of a weight of the object on a platter of the barcode reader; 2) a dwell identified by an infrared proximity sensor system; 3) a manual input; 4) or an audio input.

19. The barcode reader of claim 17, wherein the controller is configured to process the first monochrome image data, the second monochrome image data, and the third monochrome image data and is configured to identify and compensate for movement of the object within at least one of the first monochrome image data, the second monochrome image data, or the third monochrome image data to enable a position of the object within the first monochrome image data, the second monochrome image data, and the third monochrome image data to substantially align.

20. The barcode reader of claim 17, wherein the controller is configured to determine the color of the object by generating a color vector of the object based on the first monochrome image data, the second monochrome image data, and the third monochrome image data and comparing the color vector to reference data.

* * * * *